(12) United States Patent
Chang et al.

(10) Patent No.: US 10,739,131 B2
(45) Date of Patent: Aug. 11, 2020

(54) THREE-DIMENSIONAL SCANNING DEVICE USING STRUCTURED LIGHT

(71) Applicant: MEDIT CORP., Seoul (KR)

(72) Inventors: Minho Chang, Seoul (KR); Soobok Lee, Seoul (KR); Jiwoong Chang, Seoul (KR); Sungbin Im, Seoul (KR); Euijeong Song, Seoul (KR); Hansol Kim, Seoul (KR); Seungjin Lee, Gunpo-si (KR)

(73) Assignee: MEDIT CORP., Seoul (KR)

( * ) Notice: Subject to any disclaimer, the term of this patent is extended or adjusted under 35 U.S.C. 154(b) by 0 days.

(21) Appl. No.: 16/097,333

(22) PCT Filed: Apr. 26, 2017

(86) PCT No.: PCT/KR2017/004457
§ 371 (c)(1),
(2) Date: Oct. 29, 2018

(87) PCT Pub. No.: WO2017/188732
PCT Pub. Date: Nov. 2, 2017

(65) Prior Publication Data
US 2019/0137266 A1 May 9, 2019

(30) Foreign Application Priority Data
Apr. 28, 2016 (KR) ........................ 10-2016-0052227

(51) Int. Cl.
*G01B 11/25* (2006.01)
*G06T 7/521* (2017.01)
*G06K 9/20* (2006.01)

(52) U.S. Cl.
CPC ...... *G01B 11/2518* (2013.01); *G01B 11/2513* (2013.01); *G06K 9/20* (2013.01);
(Continued)

(58) Field of Classification Search
CPC ....... G01B 11/002; G01B 11/22; G01B 11/24; G01B 11/2408; G01B 11/2416;
(Continued)

(56) References Cited

U.S. PATENT DOCUMENTS 6,495,848 B1 * 12/2002 Rubbert ................. G06T 7/521
250/559.22
8,090,194 B2  1/2012 Golrdon et al.
(Continued)

FOREIGN PATENT DOCUMENTS

| JP | 2014-517285 A | 7/2014 |
|---|---|---|
| KR | 10-2014-0061230 A | 5/2014 |
| KR | 10-2015-0133591 A | 11/2015 |
| KR | 10-2016-0014717 A | 2/2016 |

OTHER PUBLICATIONS

International Search Report for PCT/KR2017/004457 dated Jul. 18, 2017 from Korean Intellectual Property Office.

*Primary Examiner* — Gordon J Stock, Jr.
(74) *Attorney, Agent, or Firm* — Paratus Law Group, PLLC

(57) ABSTRACT

A three-dimensional scanning device including: a projection unit for projecting a wide-area pattern and a local pattern on an object to be measured; an image acquisition unit for acquiring an image of the object on which the wide-area pattern and the local pattern are projected; a detection unit for detecting the locations of a plurality of first IDs that are identifiers formed in the shape that can be distinguished utilizing image information in a space within a certain range in the image of the object, on which the wide-area pattern is projected, acquired by the image acquisition unit; a collection unit for collecting data on a brightness value within a predetermined certain distance with respect to the center
(Continued)

point of the detected first ID; and an operation unit for determining a first ID value of the first ID using information of the collection unit.

13 Claims, 6 Drawing Sheets

(52) U.S. Cl.
CPC ............ *G06K 9/2036* (2013.01); *G06T 7/521* (2017.01); *G06K 2209/401* (2013.01)

(58) Field of Classification Search
CPC . G01B 11/2425; G01B 11/25; G01B 11/2504; G01B 11/2509; G01B 11/2513; G01B 11/2518; G01B 11/2522; G01B 11/2527; G01B 11/2531; G01B 11/2436; G01B 11/254; G06T 7/70; G06T 7/73; G06T 7/74; G06T 7/75; G06T 7/50; G06T 7/521; G06T 7/55; G06T 2207/10028
See application file for complete search history.

(56) References Cited

U.S. PATENT DOCUMENTS

| | | | | |
|---|---|---|---|---|
| 8,908,016 B2* | 12/2014 | Gordon | ................. | G01B 11/002 348/49 |
| 9,294,758 B2* | 3/2016 | Xiong | .................. | H04N 13/271 |
| 9,367,952 B2* | 6/2016 | Gordon | .................. | G01B 11/25 |
| 9,696,137 B2* | 7/2017 | Braker | ................. | G01B 11/2518 |
| 9,881,375 B2* | 1/2018 | Gordon | ..................... | G06T 7/80 |
| 9,915,827 B2* | 3/2018 | Gordon | ..................... | G01C 3/02 |
| 10,404,967 B2* | 9/2019 | Willomitzer | ......... | H04N 13/239 |
| 10,408,605 B2* | 9/2019 | Raz | ........................ | G01B 11/22 |
| 2010/0118123 A1* | 5/2010 | Freedman | ............ | G06K 9/2036 348/46 |
| 2011/0080471 A1* | 4/2011 | Song | .................... | G01B 11/245 348/46 |
| 2014/0002445 A1* | 1/2014 | Xiong | .................. | H04N 13/271 345/419 |
| 2014/0226863 A1* | 8/2014 | Bernstein | .............. | G06T 1/0014 382/106 |
| 2014/0267701 A1* | 9/2014 | Aviv | .................... | G01C 11/025 348/136 |
| 2018/0106593 A1* | 4/2018 | Arden | .................... | H04N 5/232 |
| 2018/0227570 A1* | 8/2018 | Page | .................... | H04N 13/122 |

* cited by examiner

[FIG. 1]
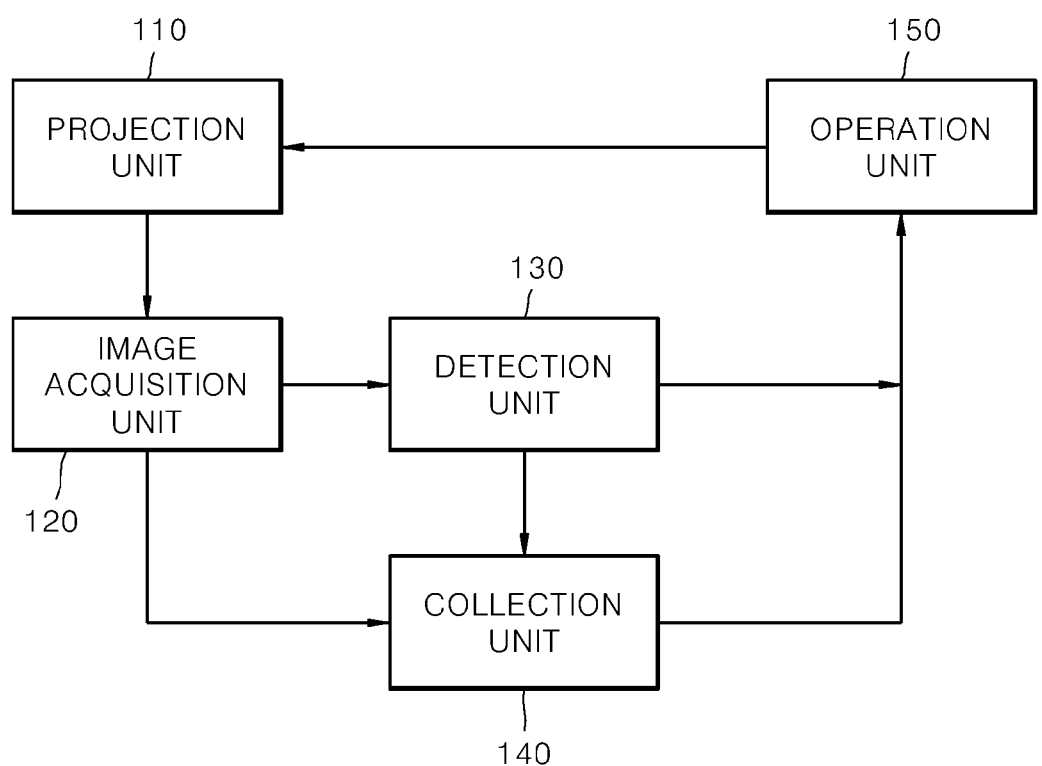

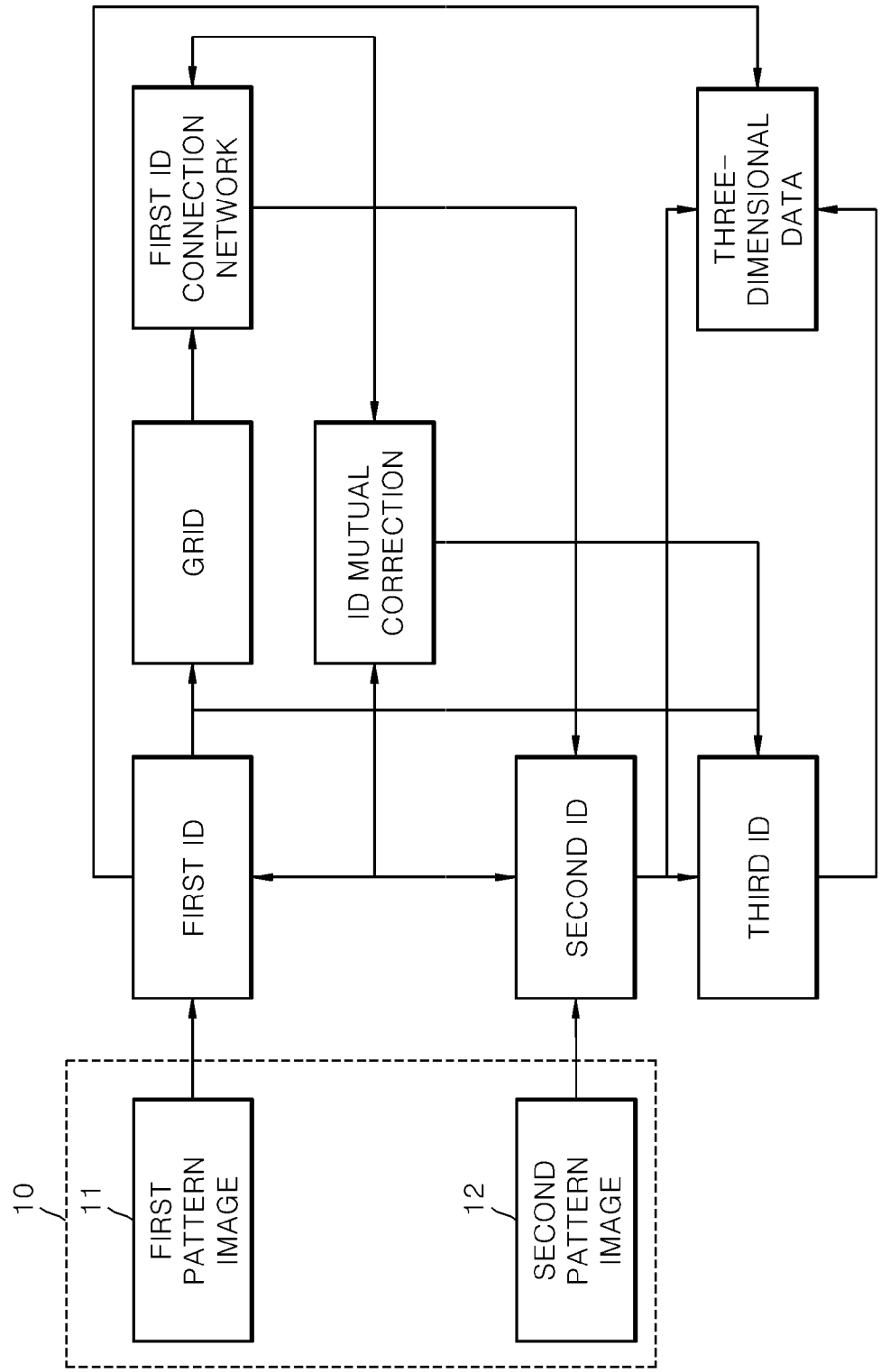
[FIG. 2]

[FIG. 3]
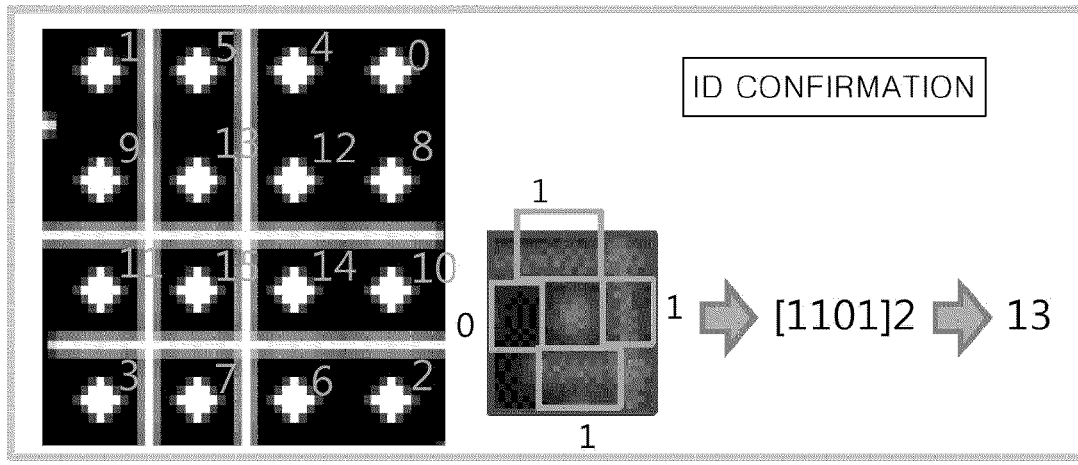
[FIG. 4]
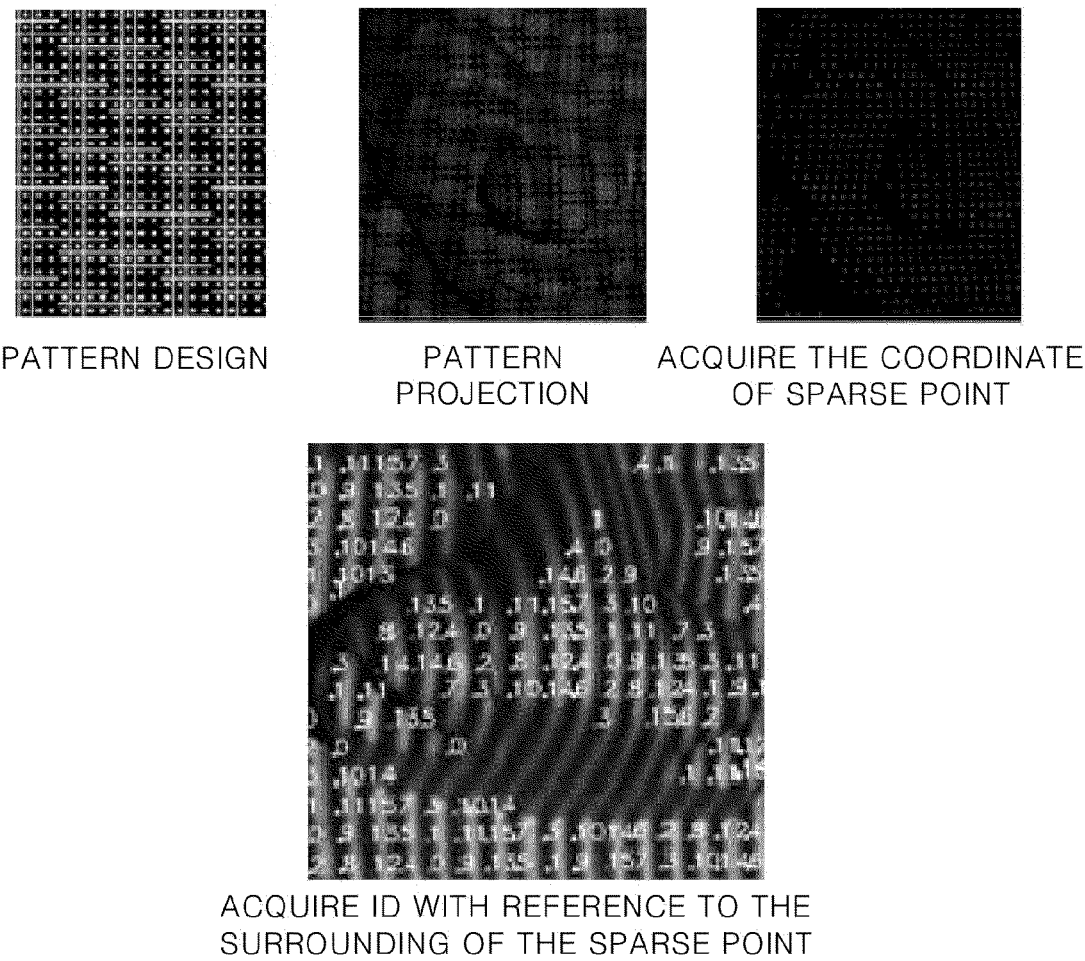
PATTERN DESIGN    PATTERN PROJECTION    ACQUIRE THE COORDINATE OF SPARSE POINT
ACQUIRE ID WITH REFERENCE TO THE SURROUNDING OF THE SPARSE POINT

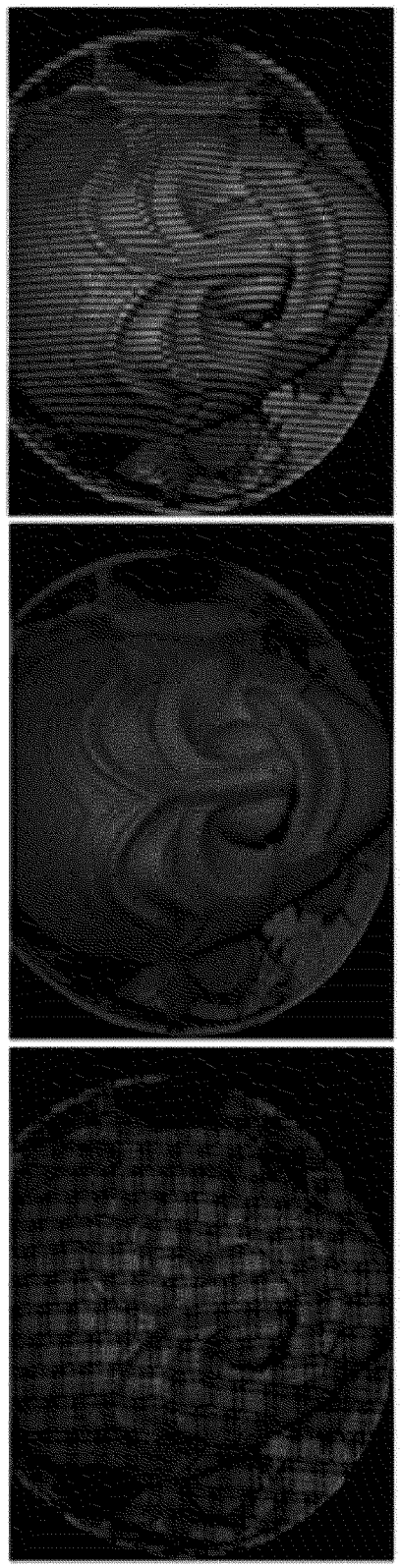
[FIG. 5]

[FIG. 6]
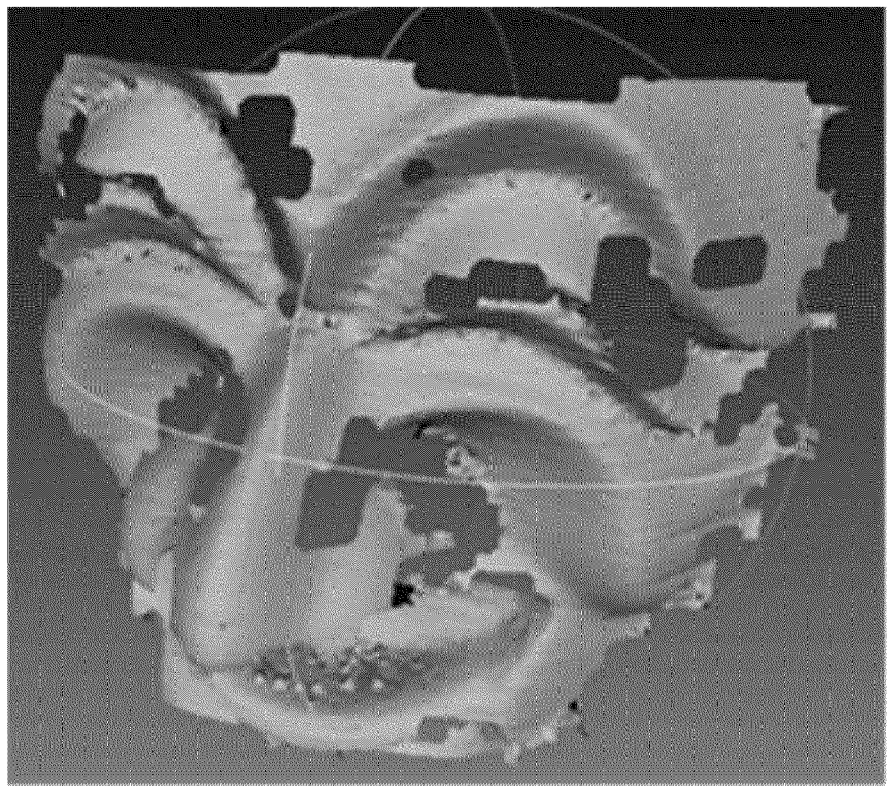
[FIG. 7]
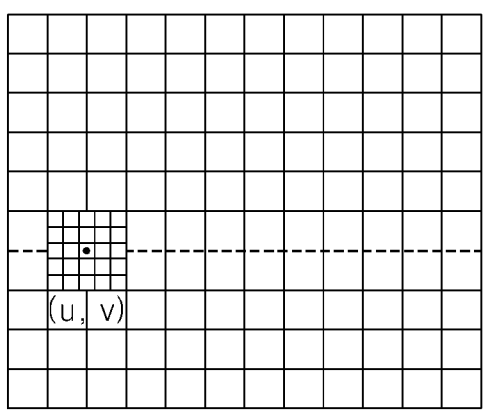
image 1
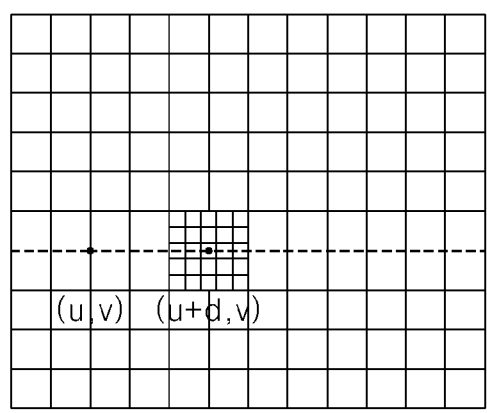
image 2

[FIG. 8]

THREE-DIMENSIONAL SCANNING DEVICE USING STRUCTURED LIGHT

CROSS REFERENCE TO PRIOR APPLICATIONS

This application is a National Stage Patent Application of PCT International Patent Application No. PCT/KR2017/004457 (filed on Apr. 26, 2017) under 35 U.S.C. § 371, which claims priority to Korean Patent Application No. 10-2016-0052227 (filed on Apr. 28, 2016), which are all hereby incorporated by reference in their entirety.

BACKGROUND

The present disclosure relates to a three-dimensional scanning device using structured light, and more particularly, to a three-dimensional scanning device and method, which irradiates encoded structured light to an object to be measured, acquires it by an image device, and then acquires three-dimensional location information on the surface of the object to be measured through the analysis therefor.

Three-dimensional scanning is used in various industrial fields such as reverse design, measurement, inspection, contents generation, and CAD/CAM, and scanning performance enhances as computing technology advances, such that the three-dimensional scanning is increasingly used in various fields.

In recent years, real-time scanning technology, which can acquire data of several frames or more per second and easily acquire three-dimensional data by an ordinary user who has not been professionally trained through automated data processing, has been rapidly developed.

The real-time scanning mainly uses a structured light method that projects a structured pattern on an object to be measured using an optical projection device, acquires it through an image device, and then analyzes the acquired image to calculate three-dimensional data. This is because the structured light method can acquire a large area of three-dimensional data at once and accordingly, is suitable for the real-time scanning for measuring the three-dimensional data while moving a scanner at a high speed.

Conventionally, a pattern of a Digital Fringe Pattern (DFP) method has been mainly used for three-dimensional scanning. Particularly, a pattern that combines a Gray Code, which has advantages in the stability, resolution, and operation time of data, with a Phase Shift is widely used.

However, there is a problem in that the number of patterns used in the Gray Code-Phase Shift pattern is large due to the characteristic of the method (generally, 10 patterns or more), such that when the scanning is performed while the scanner and the object move with each other, the location where the pattern is formed is changed during the measurement, thus not properly performing the scanning.

In order to solve this problem, pattern technologies for reducing the number of patterns used for measurement such as an M-array were commercialized, but there was a problem in that several pixels are used in an image in order to give an ID while reducing the number of patterns, thus reducing the resolution of the measured three-dimensional data. Accordingly, there is a need for a technique that can acquire three-dimensional data in high resolution while reducing the number of patterns to be suitable for real-time measurement.

Meanwhile, U.S. Pat. No. 8,090,194 (registered on Jan. 3, 2012) has been disclosed as the related art thereof.

SUMMARY

The present disclosure relates to a three-dimensional scanning device using structured light, and an object of the present disclosure is to provide a three-dimensional scanning device, which irradiates encoded structured light to an object to be measured, acquires it by an image device, and then acquires three-dimensional location information on the surface of the object to be measured through the analysis therefor, and more particularly, to provide a method for acquiring three-dimensional data in high resolution even while using a small number of structured light patterns to be suitable for the real-time scanning.

A three-dimensional scanning device using structured light in accordance with the present disclosure includes a projection unit for projecting a first pattern that is a wide-area pattern and a second pattern that is a local pattern on an object to be measured; an image acquisition unit for acquiring an image of the object to be measured on which the first pattern and the second pattern are projected; a detection unit for detecting the locations of a plurality of first IDs that are identifiers formed in the shape that can be distinguished utilizing image information in a space within a certain range in the image of the object to be measured, on which the first pattern is projected, acquired by the image acquisition unit; a collection unit for collecting data on a brightness value within a predetermined certain distance with respect to the center point of the detected first ID; and an operation unit for determining a first ID value of the first ID using information of the collection unit.

In addition, the operation unit can divide the space within the certain distance with respect to the center point of the first ID by a unit of a certain angle, then inspect the brightness values in the divided spaces, respectively to confirm whether or not to exceed a predetermined threshold value, then gives a value of 0 or 1 thereto, and can determine the first ID value through a 2 Bit operation by the number of divisions.

In addition, the operation unit can differentiate the brightness value acquired by the certain distance in the direction arbitrarily divided with respect to the center point of the first ID to detect the point where the brightness value is abruptly changed to give a value of 0 or 1 thereto, and can determine the first ID value through a 2 Bit operation by the number of the arbitrarily divided directions.

In addition, the operation unit can locate the plurality of first IDs acquired from the first pattern in the X-Y direction by the certain distance according to a geometric condition of a two-dimensional image, and when the connection relationship between a specific first ID and other first IDs within the certain distance is confirmed, the specific first ID and the other first IDs can be grouped to form one grid.

In addition, the operation unit can perform any one processing among noise removal, gamma value adjustment, brightness equalization, or threshold value processing for the image of the first pattern and the image of the second pattern, respectively.

In addition, the detection unit can detect the locations of a plurality of second IDs that are identifiers formed in the shape that can be distinguished utilizing image information of the object to be measured, on which the second pattern is projected, acquired by the image acquisition unit, and the second pattern can be a pattern pixel by pixel in the space between the first IDs.

In addition, the second pattern can be a Fringe pattern.

In addition, the detection unit can detect the locations of a plurality of second IDs that are identifiers formed in the shape that can be distinguished utilizing image information of the object to be measured, on which the second pattern is projected, acquired by the image acquisition unit, and the operation unit can perform the operation of a value of the second ID using the second pattern only when the connection relationship between the first IDs are confirmed.

In addition, the detection unit can detect the locations of a plurality of second IDs that are identifiers formed in the shape that can be distinguished utilizing image information of the object to be measured, on which the second pattern is projected, acquired by the image acquisition unit, and the operation unit can correct a value of the second ID using the image on which the first pattern is projected, and the value or location of the first ID, which is calculated from the image on which the first pattern is projected, or the grid.

In addition, the detection unit can detect the locations of a plurality of second IDs that are identifiers formed in the shape that can be distinguished utilizing image information of the object to be measured, on which the second pattern is projected, acquired by the image acquisition unit, and the operation unit can correct a value of the first ID using the image on which the second pattern is projected, and the value or location of the second ID that is calculated from the image on which the second pattern is projected.

In addition, the operation unit can calculate three-dimensional data using the first ID and the second ID acquired from the first pattern and the second pattern.

In addition, the operation unit can calculate a third ID using the first ID and the second ID acquired from the first pattern and the second pattern, and can calculate three-dimensional data using it.

According to the three-dimensional scanning device in accordance with the present disclosure that is configured as described above, it is possible to complementarily use it by combining the pattern capable of acquiring three-dimensional data in low resolution in the entire screen with the pattern capable of acquiring three-dimensional data in high resolution in the local region to acquire three-dimensional data in high resolution with a small number of patterns, thus obtaining the robust against movement and the high-quality data in real-time scanning.

BRIEF DESCRIPTION OF THE DRAWINGS

FIG. 1 is a block diagram schematically illustrating a configuration of a three-dimensional scanning device in accordance with the present disclosure.

FIG. 2 is a diagram illustrating an example of a flow of image processing information in accordance with the present disclosure.

FIG. 3 is a diagram illustrating an example of a method for detecting a first ID value in accordance with the present disclosure.

FIG. 4 is a diagram illustrating an example of calculating three-dimensional data using a first ID in accordance with the present disclosure.

FIG. 5 is a diagram illustrating an example of an image acquired by projecting the first ID and a second ID on an object to be measured in accordance with the present disclosure.

FIG. 6 is a diagram illustrating an example of an image of the three-dimensional data acquired by using the first ID, the second ID, and a third ID in accordance with the present disclosure.

FIG. 7 is a diagram illustrating an example of a method for performing a feature point operation using a first pattern in accordance with the present disclosure.

FIG. 8 is a diagram illustrating an example of performing the feature point operation using the first pattern and calculating an ID using it in accordance with the present disclosure.

DETAILED DESCRIPTION

The advantages and features of the present disclosure and the method for achieving them will become apparent with reference to the embodiments described in detail below with reference to the accompanying drawings. The present disclosure can, however, be embodied in various forms and should not be construed as limited to the embodiments disclosed herein; these embodiments are only provided so that this disclosure will be thorough and complete and will fully convey the scope of the disclosure to those skilled in the art to which the present disclosure pertains; and the present disclosure is only defined by the scope of the claims. Like reference numerals refer to like elements throughout the specification.

Hereinafter, embodiments of the present disclosure will be described in detail with reference to the drawings.

FIG. 1 is a block diagram schematically illustrating a configuration of a three-dimensional scanning device in accordance with the present disclosure.

As illustrated in FIG. 1, a three-dimensional scanning device in accordance with the present disclosure includes a projection unit 110, an image acquisition unit 120, a detection unit 130, a collection unit 140, and an operation unit 150.

The projection unit 110 projects a pattern for three-dimensional measurement. The projection unit 110 can use a digital projector using a system such as DLP, LCOS, or LCD, and can also use various types of light sources such as visible light, IR, or UV. In addition, the projection unit 110 can irradiate light that is emitted from the light source on a pre-printed pattern mask to project a pattern in a specific shape.

Preferably, the projection unit 110 can project at least two or more patterns, for example, both a first pattern and a second pattern, and can project the first pattern, the second pattern, and an additional pattern, if necessary, successively and repeatedly.

Herein, the first pattern is a wide-area pattern and is a pattern for acquiring three-dimensional data in low resolution that are not dense in the entire region of an image, and the second pattern is a local pattern and is a pattern for acquiring three-dimensional data in high resolution that are dense in some regions of the image.

The present disclosure irradiates the first pattern that is a wide-area pattern and the second pattern that is a local pattern on the object to be measured, respectively, acquires an image thereof, then generates information with which each Identification (ID) is combined using each correlation therebetween, and acquires three-dimensional data of the object to be measured using it.

Meanwhile, the image acquisition unit 120 acquires image data of the pattern projected on the object through the projection unit 110. The image acquisition unit 120 can use a digital camera or an analog camera, and can include a photographing means for photographing movement. Particularly, the image acquisition unit 120 can successively acquire the successively projected images synchronously or asynchronously.

The detection unit 130 proceeds to acquire the location of a first ID from the image acquired through the image acquisition unit 120. Herein, the 'first ID' means an identifier formed in the shape that can be distinguished utilizing image information in a space within a certain range in the image of the object to be measured on which a specific pattern (e.g., the first pattern) is projected. In this time, the detection unit 130 can confirm the shape that can become a candidate of the first ID in the acquired image, and calculate a candidate group of the first ID. The shape that can become the candidate of the first ID can be any shape as long as the shape and location thereof can be determined through image processing, but preferably, the shape can be configured in the circular or elliptical shape to confirm it with fewer operation, and the shape that can calculate the location of a clear center point thereof is configured.

The collection unit 140 collects information for determining the ID from the image acquired by the image acquisition unit 120 in order to determine whether or not the ID in the candidate group of the first ID acquired by the detection unit 130 can be clearly calculated. In this time, in order to determine the ID, the collection unit 140 can collect a brightness value within a certain range in the image with respect to the location of the candidate group of the first ID. In this time, preferably, the collection unit 140 can collect it by comparing the brightness value within a predetermined certain distance with respect to the center point of the candidate of the first ID, dividing the corresponding space by a unit of a certain angle with respect to the center point thereof, and then dividing the brightness values in the divided spaces, respectively.

In addition, the collection unit 140 can arbitrarily divide 360 degrees from the center point of the candidate group of the first ID acquired by the detection unit 130, and then acquire a brightness value in the image by a certain distance in the direction of the respective divided angles to deliver it to the operation unit 150.

Meanwhile, the operation unit 150 calculates an ID value of the candidate group using the candidate group of the first ID and the surrounding brightness values thereof that are acquired by the detection unit 130 and the collection unit 140. Herein, the 'surrounding brightness value' means a brightness value within a certain distance with respect to the center point of the first ID. In this time, the first ID can be preferably determined by comparing the brightness values within a predetermined certain distance with respect to the center point of the candidate of the first ID, dividing the corresponding space by a unit of a certain angle with respect to the center point thereof, then inspecting the respective brightness values in the divided spaces to confirm whether or not to exceed a predetermined threshold value to give a value of 0 or 1 thereto, and determining an ID value through a 2 Bit operation by the number of equal divisions.

In addition, the first ID can be determined by differentiating the brightness value acquired by a certain distance in the direction arbitrarily divided by the collection unit 140, detecting the point where the brightness value is abruptly changed by using the differential value, and giving a value of 0 or 1 thereto to determine an ID value.

Meanwhile, in order to enhance the calculation performance of the first ID and the second ID, an image processing method such as noise removal, gamma value correction, brightness equalization, or threshold value processing can be used for the image of the first pattern and the image of the second pattern, respectively.

FIG. 2 is a diagram illustrating an example of a flow of image processing information in accordance with the present disclosure.

As illustrated in FIG. 2, a first pattern image and a second pattern image are acquired by projecting the first pattern and the second pattern on the object to be measured 10.

In this time, when the first ID is calculated from the first pattern image, the location of the first ID and the type of the ID are calculated. Then, the calculated other first IDs within a certain distance from the calculated location of the first ID can be searched and connected thereto.

A plurality of first IDs can be input to the first pattern, and accordingly, the plurality of first IDs can be acquired in one image. A method for locating the plurality of first IDs in one image can be variously used, but preferably, the first IDs can be located in the X-Y direction by a certain distance according to a geometric condition of the two-dimensional image. In this time, it is possible to inspect whether or not there are other first IDs in the right, down, and right-down directions of the calculated first ID, respectively, and then to confirm the correlation therebetween. Since the correlation between the plurality of first IDs located on the first pattern is known in advance, it is possible to inspect other first IDs in the surrounding direction of the calculated first ID, thus inspecting whether or not the corresponding ID has been correctly calculated.

When the connection relationship between the first ID and the other first IDs in the surrounding thereof is confirmed, they can be grouped to form one grid. The grid can be formed only when the connection relationship between the first IDs in the grid is normal, and it is possible to prevent a wrong ID from being given thereto due to the image distortion such as the discontinued surface of the object to be measured by such a characteristic.

The grid is generated for each first ID, and then the connection relationship between the grids is calculated to generate a first ID connection network. The first ID connection network can be generated in plural according to the connection state between the grids, and information that can confirm where the consecutive portions on the surface of the object to be measured are can be generated.

Meanwhile, the first ID acquired from the first pattern image utilizes image information in a space within a certain range in the first pattern image and is formed in the shapes that can be distinguished, such that only one ID can be obtained through various pixels in the first pattern image. In addition, the three-dimensional data can be generated only using the coordinate of the center point or the feature point acquired by the detection unit 130, such that it is influenced by the precision of the coordinate of the center point or the feature point. In this time, more stable and large tolerant algorithm should be used to robustly find the center point or the feature point, such that the precision of the coordinate thereof can be reduced. Accordingly, when the three-dimensional image is acquired using only the first pattern, three-dimensional data in low resolution and low quality are acquired.

The second pattern is used to calculate a second ID value that can be acquired pixel by pixel in the pixel of the space between the first IDs of the first pattern. Herein, the second ID means an identifier formed in the shape that can be distinguished utilizing image information in a space within a certain range in the image of the object to be measured on which a specific pattern (e.g., the second pattern) is projected. In this time, the ID is calculated pixel by pixel, such that when three-dimensional data are calculated, the ID value can be recalculated in the sub-pixel level using an interpolation method, and the three-dimensional data can be also calculated in the sub-pixel level, thus acquiring data in high resolution.

The second pattern can use various types of patterns such as a De Bruijn, a random pattern, or a Fringe pattern in order to calculate an ID value pixel by pixel. Preferably, it is advantageous to generate and locate the Fringe pattern perpendicularly to the direction in which a plurality of cameras are located, thus finding a corresponding point in three-dimensional calculation while reducing the amount of operation on an Epipolar Geometry.

Conventionally, a Phase Shifting method is mainly used for analyzing the Fringe pattern, but at least three or more patterns should be used, such that a problem such as motion blur can be increased when it is applied to the real-time scanning that is an object of the present disclosure. Accordingly, for the method of the present disclosure, it is preferable to use a method capable of calculating the second ID value with one pattern in the frequency domain such as Fourier Transform or Wavelet Transform.

In this time, the pattern for calculating the second ID value can be freely located, and can be located according to an interval where the first ID of the first pattern is located for ease operation.

The first ID and the second ID thus calculated are periodically repeated by the same ID, such that ambiguity can occur in searching for the corresponding point in calculating three-dimensional data. In order to solve this problem, when the first ID is located in a certain direction by the number of IDs, a cycle in which the first ID is repeated becomes the length of the degree multiplying the type of the ID by the basic size of the first pattern, and when geometric information between a plurality of cameras is used, the section for searching for the corresponding point can be limited to within the length of the repeated cycle of the first ID.

The second ID can have a cycle corresponding to the interval of the first IDs in accordance with the embodiment, thus easily occurring ambiguity. In this time, it is possible to simultaneously compare the first ID and the second ID using the correlation between the first ID and the second ID, thus removing ambiguity of the second ID.

As describe above, the first ID and the second ID are calculated, and then the connection relationship between the first ID and the second ID is updated through the mutual correction procedure.

In addition, a method for correcting the connection relationship between the first ID and the second ID can be used. The ID calculated by the second ID represents a phase value of the Fringe pattern, and is a wrapped-phase in which a value is periodically repeated. It is possible to roughly calculate an unwrapped-phase that has removed ambiguity of the wrapped-phase using a Phase Unwrapping method mainly used in analyzing three-dimensional scanning pattern.

Using the above, it is possible to update the ID of the candidate group of the first ID in which the first ID is not calculated in the first pattern image. It is possible to confirm whether or not the calculated first ID using the unwrapped-phase and the candidate of the first ID not calculated mutually have the connection relationship, and then to give the first ID thereto using a predetermined pattern location order when they have the connection relationship therebetween.

On the contrary, the Phase-unwrapping of the second ID can be corrected using the first ID image. The first ID image is in the form of a specific shape repeated sporadically, a feature point in the image can be easily calculated, and the correlation between the feature points can be calculated using a method such as Block-matching. The first ID or the second ID is corrected using the correlation between the feature points and the unwrapped-phase.

In addition, the first ID and the second ID can be combined to create an integrated third ID.

The three-dimensional data are finally calculated under a stereo vision system using the first ID, the second ID, or the third ID thus generated.

FIG. 3 is a diagram illustrating an example of a method for detecting a first ID value in accordance with the present disclosure.

As illustrated in FIG. 3, a circular pattern is periodically located to calculate the location of the first ID. In this time, the detection unit 130 can detect the located circular pattern, and the collection unit 140 can inspect the brightness values of the up/down/left/right of the pattern as illustrated in the center of FIG. 3 to give an ID of 4 Bit (e.g., [1101]) thereto. In FIG. 3, a straight-line shape is used to have a difference in the brightness values in the pattern.

FIG. 4 is a diagram illustrating an example of calculating three-dimensional data using the first ID in accordance with the present disclosure.

It can be calculated to be used for the three-dimensional calculation by projecting a designed pattern on the object to be measured, acquiring the first ID from the projected image, and then giving the ID thereto.

FIG. 5 is a diagram illustrating an example of an image acquired by projecting the first ID and the second ID on the object to be measured in accordance with the present disclosure.

The left image therein is the first pattern image on which the first pattern is projected, and the right image therein is the second pattern image on which the second pattern is projected. The center image therein is an image on which a pattern is not projected and can be used to correct the first image and the second image.

FIG. 6 is a diagram illustrating an example of an image of three-dimensional data acquired by using the first ID, the second ID, and the third ID in accordance with the present disclosure.

The third ID can be finally calculated by using the image acquired in FIG. 6, and then the three-dimensional image can be restored by using it.

FIG. 7 is a diagram illustrating an example of a method for performing a feature point operation using the first pattern in accordance with the present disclosure.

In FIG. 7, the feature point operation can be performed by performing a spatial operation such as a convolution filter for pixels within a certain range with respect to the pixels of each image. When a similar shape is measured at different angles, the brightness value can be greatly changed depending on the illumination, etc., but the geometric relationship with the surrounding shape or the texture of the printed surface, etc. is kept the same, such that a feature value can be found by using the relationship between the brightness values of the surrounding pixels.

FIG. 8 is a diagram illustrating an example of performing the feature point operation using the first pattern and calculating an ID using it in accordance with the present disclosure.

When the Phase-unwrapping method is used with respect to the calculated feature point in FIG. 8, the ID image as in FIG. 8 can be acquired. This can be used to correct the first ID and the second ID, thus enhancing the acquisition amount of the ID and the quality thereof.

Accordingly, in the present disclosure, the three-dimensional scanning method in accordance with the present disclosure, which is configured as described above, can complementarily use it by combining the pattern capable of acquiring three-dimensional data in low resolution in the entire screen and the pattern capable of acquiring three-dimensional data in high resolution in the local region to acquire three-dimensional data in high resolution with a small number of patterns, thus obtaining the robust against movement and the high-quality data in real-time scanning.

The present disclosure is not necessarily limited to these embodiments, as all the constituent elements constituting the embodiment of the present disclosure have been described as being combined and operating together. Within the scope of the present disclosure, depending on the embodiment, all of the components can operate selectively in combination with one or more.

The description above is merely illustrative of the technical idea of the present disclosure, and various modifications and changes can be made by those skilled in the art to which the present disclosure pertains without departing from the essential characteristics of the present disclosure.

According to the present disclosure, it is possible to complementarily use it by combining the pattern capable of acquiring three-dimensional data in low resolution in the entire screen and the pattern capable of acquiring three-dimensional data in high resolution in the local region to acquire three-dimensional data in high resolution with a small number of patterns, thus manufacturing the three-dimensional scanning device capable of obtaining the robust against movement and the high quality data in real-time scanning.

The invention claimed is:

1. A three-dimensional scanning device using structured light, comprising:
    a projector configured to project a first pattern that is a wide-area pattern and a second pattern that is a local pattern on an object to be measured;
    a camera configured to acquire an image of the object to be measured on which the first pattern and the second pattern are projected, wherein the wide-area pattern is projected in an entire region of the image and the local pattern is projected in one or more regions of the image within the entire region of the image; and
    at least one computer configured to
        detect locations of a plurality of first IDs that are identifiers formed in a shape that can be distinguished utilizing image information in a space within a certain range in the image of the object to be measured, on which the first pattern is projected, acquired by the camera,
        collect data on a brightness value within a predetermined certain distance with respect to a center point of each detected first ID of the plurality of first IDs, and
        determine a first ID value of each first ID of the plurality of first IDs using information of the collected data.

2. The three-dimensional scanning device using structured light of claim 1,
    wherein the at least one computer divides the space within the certain distance with respect to the center point of the first ID by a unit of a certain angle, then inspects the brightness values in the divided spaces, respectively to confirm whether or not to exceed a predetermined threshold value, and then gives a value of 0 or 1 thereto, and determines each first ID value through a 2 Bit operation by a number of divisions.

3. The three-dimensional scanning device using structured light of claim 1,
    wherein the at least one computer differentiates the brightness value acquired by the certain distance in a direction arbitrarily divided with respect to the center point of the first ID to detect the point where the brightness value is abruptly changed to give a value of 0 or 1 thereto, and determines each first ID value through a 2 Bit operation by a number of the arbitrarily divided directions.

4. The three-dimensional scanning device using structured light of claim 1,
    wherein the at least one computer locates the plurality of first IDs acquired from the first pattern in an X-Y direction by the certain distance according to a geometric condition of a two-dimensional image, and when a connection relationship between a specific first ID and other first IDs of the plurality of first IDs within the certain distance is confirmed, the specific first ID and the other first IDs are grouped to form one grid.

5. The three-dimensional scanning device using structured light of claim 1,
    wherein the at least one computer performs any one processing among noise removal, gamma value adjustment, brightness equalization, or threshold value processing for an image of the first pattern and an image of the second pattern, respectively.

6. The three-dimensional scanning device using structured light of claim 1,
    wherein the at least one computer detects locations of a plurality of second IDs that are identifiers formed in a shape that can be distinguished utilizing image information of the object to be measured, on which the second pattern is projected, acquired by the camera, and
    wherein the second pattern is a pattern pixel by pixel in a space between first IDs of the plurality of first IDs.

7. The three-dimensional scanning device using structured light of claim 6,
    wherein the second pattern is a Fringe pattern.

8. The three-dimensional scanning device using structured light of claim 4,
    wherein the at least one computer detects locations of a plurality of second IDs that are identifiers formed in a shape that can be distinguished utilizing image information of the object to be measured, on which the second pattern is projected, acquired by the camera, and
    wherein the at least one computer determines a second ID value of each second ID of the plurality of second IDs using the second pattern only when the connection relationship between the first IDs is confirmed.

9. The three-dimensional scanning device using structured light of claim 4,
    wherein the at least one computer detects locations of a plurality of second IDs that are identifiers formed in a shape that can be distinguished utilizing the acquired image of the object to be measured, on which the second pattern is projected, and
    wherein the at least one computer corrects a second ID value of each second ID of the plurality of second IDs using the image on which the first pattern is projected, and the first ID value or location of each first ID, which is calculated from the image on which the first pattern is projected, or the grid.

10. The three-dimensional scanning device using structured light of claim 4,
   wherein the at least one computer detects locations of a plurality of second IDs that are identifiers formed in a shape that can be distinguished utilizing image information of the object to be measured, on which the second pattern is projected, acquired by the camera, and
   wherein the at least one computer corrects a value of each first ID using the image on which the second pattern is projected, and a second ID value or location of each second ID, which is calculated from the image on which the second pattern is projected.

11. The three-dimensional scanning device using structured light of claim 6,
   wherein the at least one computer calculates three-dimensional data using the plurality of first IDs and the plurality of second IDs acquired from the first pattern and the second pattern.

12. The three-dimensional scanning device using structured light of claim 6,
   wherein the at least one computer calculates a third ID using the plurality of first IDs and the plurality of second IDs acquired from the first pattern and the second pattern, and calculates three-dimensional data using the third ID.

13. The three-dimensional scanning device using structured light of claim 1,
   wherein the first pattern has a first resolution and the second pattern has a second resolution higher than the first resolution.

* * * * *